United States Patent [19]
Wiesenfeldt et al.

[11] Patent Number: 6,080,209
[45] Date of Patent: Jun. 27, 2000

[54] STABLE COLORANT COMPOSITIONS

[75] Inventors: Matthias Wiesenfeldt, Dannstadt-Schauernheim; Johannes Peter Dix, Weisenheim; Rudolf Paulus; Manfred Herrmann, both of Ludwigshafen, all of Germany

[73] Assignee: BASF Aktiengesellschaft, Ludwigshafen, Germany

[21] Appl. No.: 09/147,049

[22] PCT Filed: Mar. 10, 1997

[86] PCT No.: PCT/EP97/01204

§ 371 Date: Sep. 25, 1998

§ 102(e) Date: Sep. 25, 1998

[87] PCT Pub. No.: WO97/35927

PCT Pub. Date: Oct. 2, 1997

[30] Foreign Application Priority Data

Mar. 26, 1996 [DE] Germany .......................... 196 11 870

[51] Int. Cl.$^7$ ...................................... D06P 3/32
[52] U.S. Cl. .................. 8/437; 8/436; 8/557; 8/558; 8/637.1; 8/676; 8/681; 8/682; 8/683; 8/685; 8/687
[58] Field of Search .................. 8/436, 437, 557, 8/558, 618, 637.1, 681, 682, 683, 685, 687, 676

[56] References Cited

U.S. PATENT DOCUMENTS

| | | | |
|---|---|---|---|
| 4,160,642 | 7/1979 | Desiderio | 8/436 |
| 4,491,612 | 1/1985 | Fischer | 427/412 |
| 4,510,302 | 4/1985 | Kolb et al. | 526/264 |
| 4,912,013 | 3/1990 | Suzuki et al. | 430/157 |
| 4,983,185 | 1/1991 | Streicher et al. | 8/436 |
| 5,007,941 | 4/1991 | Martinelli et al. | 8/436 |
| 5,152,801 | 10/1992 | Altermatt et al. | 8/436 |
| 5,159,000 | 10/1992 | Fischer et al. | 524/127 |
| 5,212,272 | 5/1993 | Sargent et al. | 526/317.1 |
| 5,240,466 | 8/1993 | Bauer et al. | 8/437 |

FOREIGN PATENT DOCUMENTS

| | | |
|---|---|---|
| 0 086 354 | 8/1983 | European Pat. Off. . |
| 0 344 555 | 12/1989 | European Pat. Off. . |
| 0 377 409 | 7/1990 | European Pat. Off. . |
| 0 433 229 | 6/1991 | European Pat. Off. . |
| 0 648 816 | 4/1995 | European Pat. Off. . |
| 767 809 | 10/1953 | Germany . |
| 5117569 | 5/1993 | Japan . |
| 5-247391 | 9/1993 | Japan . |
| 276 525 | 10/1964 | Netherlands . |

OTHER PUBLICATIONS

Colour Index, Third Edition, vol. 4, The Society of Dyers and Colourists, pp. 4073 & 4086, 1971, (No Month Available).

Derwent Abstract of JP 56–155,262 A, Canon KK, Dec. 1981.

Derwent Abstract of JP 56–155,260 A, Canon KK, Dec. 1981.

Webster's II New Riverside University Dictionary, The Riverside Publishing Company, p. 927, 1984 (No Month Available).

The Chemistry of Synthetic Dyes, vol. VIII, p. 37, Academic Press 1978, J.F. Feeman, (No Month Available).

*Primary Examiner*—Caroline D. Liott
*Attorney, Agent, or Firm*—Oblon, Spivak, McClelland, Maier & Neustadt, P.C.

[57] ABSTRACT

Stable aqueous dye compositions containing at least one anionic colorant and at least one pigment and a polyanionic thickening agent. The dye compositions may be used to dye leather.

9 Claims, No Drawings

STABLE COLORANT COMPOSITIONS

DESCRIPTION

The present invention relates to stable aqueous colorant compositions comprising at least one anionic dye, at least one pigment and a polyanionic thickener.

The present invention further relates to the use of these colorant compositions for dyeing leather and to a process for dyeing leather with the aid of the colorant compositions.

Aqueous colorant compositions, eg. colorant liquors for leather dyeing, comprising pigments and anionic dyes are long known. These colorant liquors are usually prepared by mixing solid or liquid pigment and dye preparations with water immediately prior to the leather dyeing. Such aqueous colorant compositions are described for example in EP-B1-0 377 409 and EP-A2-0 344 555.

The disadvantage of this process is that an additional mixing operation has to take place before every dyeing. This mixing operation requires costly metering means and harbors the risk of variable colorant compositions and hence of inconsistent dyeing results. Aqueous mixtures of water, suspended pigments and anionic dyes are ready prepared to avoid these problems. However, the use of these colorant compositions is difficult because the aqueous pigment suspensions are not stable to storage. Existing colorant compositions sediment or tend to spontaneous crystallization on storage, which leads to difficulties with the colorant metering and to nonuniform dyeing results.

There are also colorant compositions, for example Trupocor® Black N liquid from Trumpler, which are thixotropic because of thixotropicizing additives. True, such compositions are stable in storage, but they are difficult to handle and cause problems in automatic metering means, for example.

It is an object of the present invention to provide aqueous colorant compositions which overcome these disadvantages, exhibit satisfactory storage stability and permit uncomplicated handling and metering.

We have found that this object is achieved by the colorant compositions described at the beginning.

The colorant compositions of this invention preferably comprise

5–40% by weight of one or more anionic dyes,
2–30% by weight of one or more pigments,
1–20% by weight of a polyanionic thickener, and
50–92% by weight of water or predominantly aqueous diluent, based in each case on the total weight of these four components.

The colorant compositions particularly preferably comprise

8–18% by weight of one or more dyes,
5–17% by weight of one or more pigments,
3–15% by weight of a polyanionic thickener, and
50–84% by weight of water or predominantly aqueous diluent.

Very particular preference is given to colorant compositions comprising

11–14% by weight of one or more dyes,
8–11% by weight of one or more pigments,
4–10% by weight of a polyanionic thickener, and
65–77% by weight of water or predominantly aqueous diluent.

The diluent in the colorant composition is generally water, but other, water-miscible solvents may be present in the diluent, too. Suitable solvents include for example alcohols such as methanol, ethanol, n-propanol or isopropanol and glycols such as ethylene glycol, diethylene glycol or propylene glycol.

Suitable dyes include all water-soluble acid dyes, for example the well known azo, metal phthalocyanine or anthraquinone dyes which contain at least one sulfonic acid group. Of course, metal complexes of anionic azo dyes are also embraced by the claims.

Preferred anionic dyes for the colorant compositions of this invention are acid dyes of the general formula I

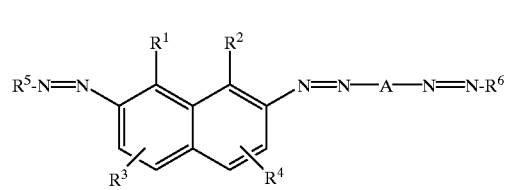

where
$R^1$ and $R^2$ are each hydroxyl, amino or hydrogen, one of the radicals being hydroxyl,
$R^3$ and $R^4$ are each hydrogen or $SO_3H$, one of the radicals being $SO_3H$,
$R^5$ is a substituted or unsubstituted phenyl or naphthyl radical,
$R^6$ is a substituted phenyl or naphthyl radical, at least one substituent being an amino or hydroxyl group, and
A is

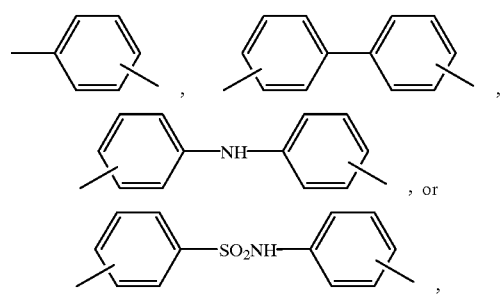

where the aromatic rings are substituted or unsubstituted, for example by sulfo, $C_1$–$C_4$-alkyl and/or $C_1$–$C_4$-alkoxy groups.

$R^1$ and $R^2$ are each preferably hydroxyl or amino; it is particularly preferred for $R^1$ to be amino and $R^2$ to be hydroxyl.

$R^3$ and $R^4$ are each preferably $SO_3H$ preferably disposed ortho to the diazo group.

Examples of radicals suitable as $R^5$ include substituted naphthyl or phenyl radicals, preferably substituted phenyl radicals. The aromatic ring systems can be monosubstituted or polysubstituted, for example monosubstituted, disubstituted or trisubstituted. Suitable substituents include for example nitro, cyano, halogen such as chlorine or bromine, $SO_3H$, hydroxyl, amino, $C_1$–$C_4$-alkylamino, dialkylamino, N-morpholino, anilino, toluidino or $C_1$–$C_4$-alkyl, of which nitro is preferred. p-Nitrophenyl is particularly preferred for $R^5$. A further suitable substituent for the phenyl or naphthyl radicals $R^5$ is a radical of the formula

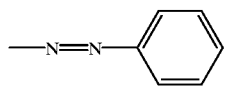

which may be substituted, for example by hydroxyl, amino, $C_1$–$C_4$-alkyl, $C_1$–$C_4$-alkoxy, chlorine, sulfo or toluidino.

Suitable substituents for the substituted phenyl or naphthyl radicals $R^6$ include the radicals mentioned for the corresponding substituents of $R^5$. As well as amino and hydroxyl, preference also extends to N-morpholino and $SO_3H$.

Preferred bridging members A are

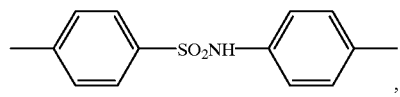

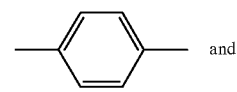

and

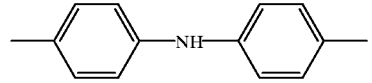

which groups, if substituted, preferably carry one or more hydroxyl radicals. The phenylene rings of the bridging members are preferably unsubstituted.

Suitable $C_1$–$C_4$-alkyl and $C_1$–$C_4$-alkoxy substituents include in general methyl, ethyl, n-propyl, isopropyl, n-butyl, isobutyl, sec-butyl and tert-butyl and the corresponding alkoxy radicals, respectively.

Particularly preferred dyes of the formula I are

Ia

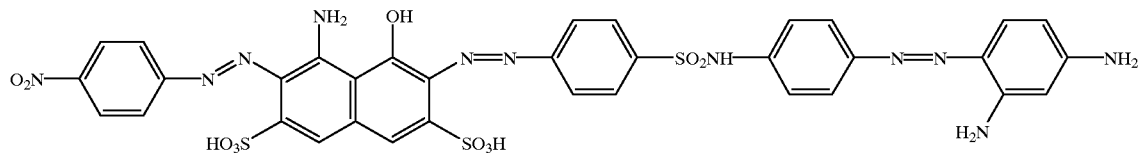

Ib

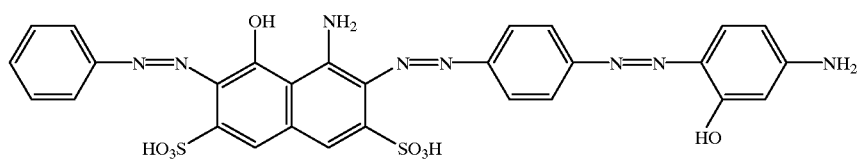

Ic

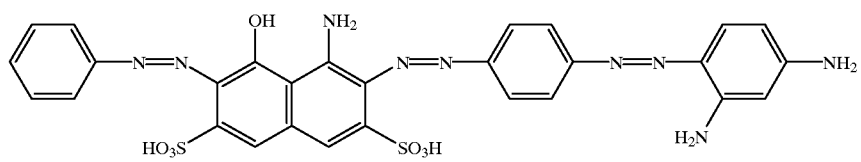

Id

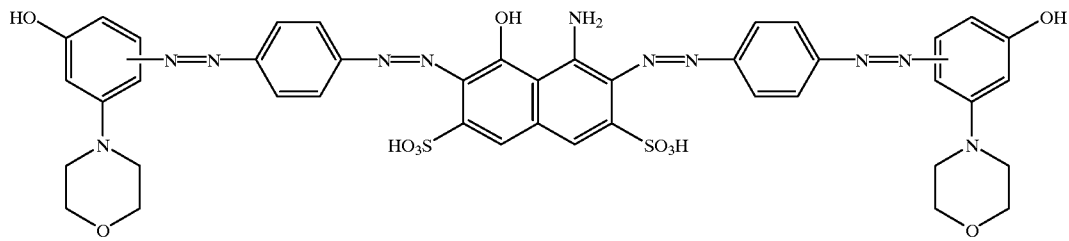

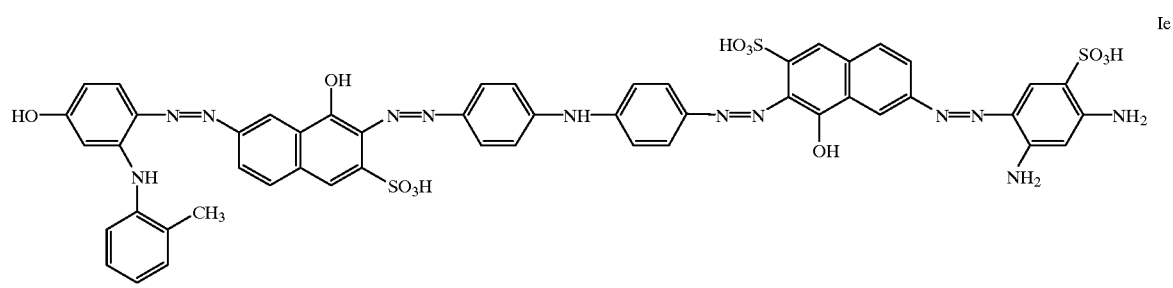
Ie
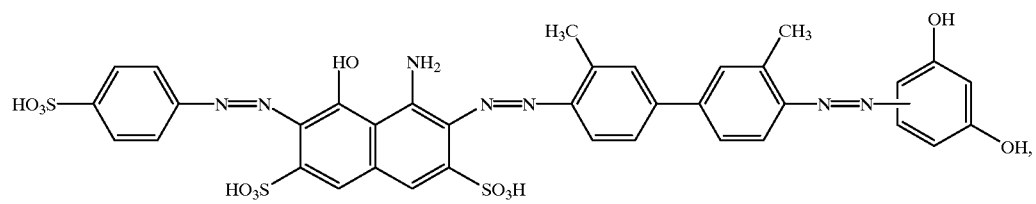
If
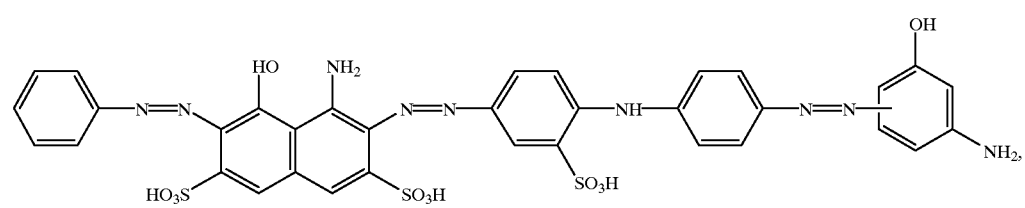
Ig
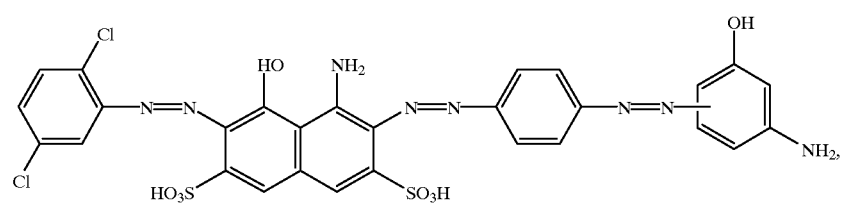
Ih
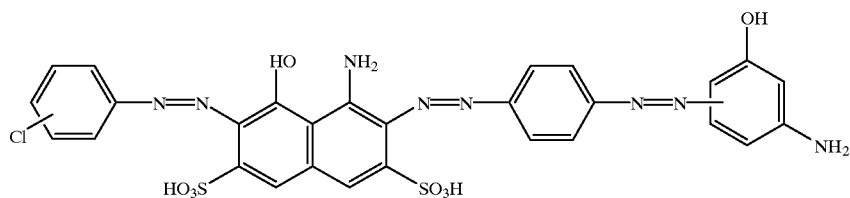
Ii
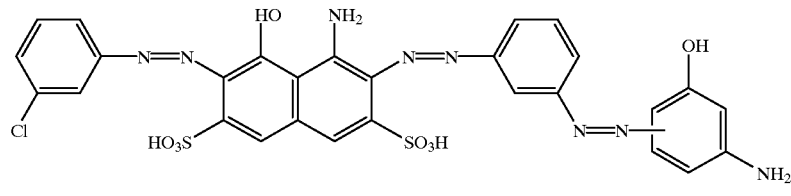
Ik
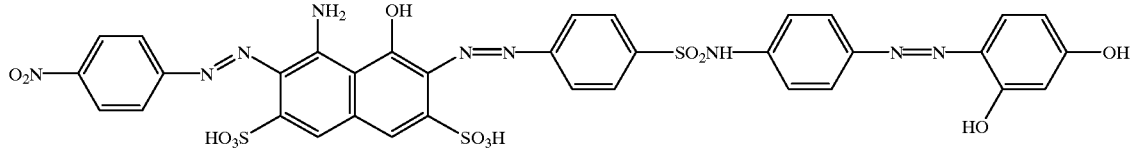
Im As well as dyes of the formula I, the colorant compositions of this invention may include metallized or unmetallized acid dyes of the formula II

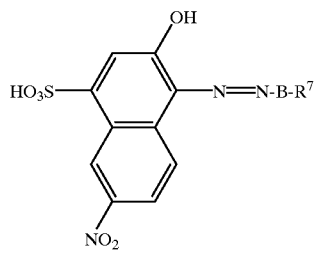

where

B is a substituted phenylene or naphthylene radical, one substituent being a hydroxyl group ortho to the diazo group, and R⁷ is hydrogen or a radical —N=N—⟨phenyl⟩   or —N=N—⟨naphthyl⟩ which may be substituted, for example by hydroxyl, amino, $C_1$–$C_4$-alkylamino, di($C_1$–$C_4$-alkyl)amino, $C_1$–$C_4$-alkyl, $C_1$–$C_4$-alkoxy or halogen, eg. chlorine.

Various substituted phenylene or naphthylene radicals are suitable for use as B. The substituents can be selected from the group consisting of the radicals mentioned as substituents for the phenyl or naphthyl radicals $R^5$. Preferred substituents besides the hydroxyl group ortho to the diazo group are a further, p-disposed hydroxyl group and also N-acetylamino.

Suitable $C_1$–$C_4$-alkyl substituents for the phenyldiazo and naphthyldiazo radicals $R^7$ include methyl, ethyl, n-propyl, isopropyl, n-butyl, isobutyl, sec-butyl and tert-butyl. The $C_1$–$C_4$-alkoxy substituents and also the $C_1$–$C_4$-alkylamino and di-$C_1$–$C_4$-alkylamino substituents may contain the same alkyl radicals.

$R^7$ is preferably hydrogen,

—N=N—⟨4-Cl, 2-OH-phenyl⟩   and   —N=N—⟨2-OH-phenyl⟩.

Particularly preferred dyes of the formula II are

IIa

IIb

IIc

Preference is given to using metal complexes, especially chromium complexes, of the dyes of the formula II.

Dyes of the formulae I and II are well known, for example from J. F. Feeman in Venkataraman, The Chemistry of Synthetic Dyes, Vol. VIII, p. 37 ff, Academic Press 1978, or are preparable in a well known manner.

The colorant compositions of this invention preferably comprise dyes and pigments of the same color, and browns and black, especially black, are preferred.

The pigments in the colorant compositions of this invention can be inorganic or organic.

Inorganic pigments useful as colorants in the process of this invention are preferably carbon blacks for black colorant compositions and iron oxides for brown colorant compositions.

Organic pigments useful as colorants in the process of this invention include for example those of the class of the monoazo pigments (eg. products derived from acetoacetarylide derivatives or from β-naphthol derivatives), laked monoazo dyes, such as laked β-hydroxynapthoic acid dyes, disazo pigments, fused disazo pigments, isoindoline derivatives, derivatives of naphthalene- or perylenetetracarboxylic acid, anthraquinone pigments, thioindigo derivatives, azomethine derivatives, quinacridones, dioxazines, pyrazoloquinazolones, phthalocyanine pigments or laked basic dyes, such as laked triarylmethane dyes.

Examples of inorganic pigments are Pigment Yellow 42 (C.I. 77 492), Pigment White 6 (C.I. 77 891), Pigment Blue 27 (C.I. 77 510), Pigment Blue 29 (C.I. 77 007), or Pigment Black 7 (C.I. 77 266) and examples of organic pigments are Pigment Yellow 1 (C.I. 11 680), Pigment Yellow 3 (C.I. 11 710), Pigment Yellow 16 (C.I. 20 040), Pigment Yellow 17 (C.I. 21 705), Pigment Yellow 42 (C.I. 77 492), Pigment Yellow 74 (C.I. 11 741), Pigment Yellow 83 (C.I. 21 108), Pigment Yellow 106, Pigment Yellow 108 (C.I. 68 240), Pigment Yellow 113, Pigment Yellow 117, Pigment Yellow 126, Pigment Yellow 139, Pigment Yellow 185, Pigment Orange 5 (C.I. 12 075), Pigment Orange 13 (C.I. 21 110), Pigment Orange 34 (C.I. 21 115), Pigment Orange 36 (C.I. 11 780), Pigment Orange 43 (C.I. 71 105), Pigment Orange 67, Pigment Red 3 (C.I. 12 120), Pigment Red 48:1 (C.I. 15 865:1), Pigment Red 48:4 (15 865:4), Pigment Red 101 (C.I. 77 491), Pigment Red 112 (C.I. 12 370), Pigment Red 122 (C.I. 73 915), Pigment Red 123 (C.I. 71 145), Pigment Red 146 (C.I. 12 485), Pigment Red 169 (C.I. 45 160:2), Pigment Red 170, Pigment Violet 19 (C.I. 46 500), Pigment Violet 23 (C.I. 51 319), Pigment Violet 27 (C.I. 42 555:3), Pigment Blue 1 (C.I. 42 595:2), Pigment Blue 15:1 (C.I. 74 160), Pigment Blue 15:3 (C.I. 74 160), Pigment Blue 61 (C.I. 42 765:1), Pigment Green 7 (C.I. 74 260), Pigment Green 8 (C.I. 10 008) or Pigment Green 36 (C.I. 74 265).

A further essential component of the colorant compositions of this invention is a polyanionic thickener. A polyanionic thickener for the purposes of this invention is a water-soluble polymer which carries negatively charged groups at neutral or alkaline pH and which, in this charged state, cause aqueous solutions and suspensions to thicken. Possible thickeners include ionic derivatives of various polymers such as cellulose, eg. carboxymethyl-cellulose or polymers or copolymers of acrylic acid and methacrylic acid. Similarly, polymers or copolymers with sulfonic acid or phosphonic acid groups can be used as thickeners. In addition, by combining different thickeners it is possible to influence the properties of the colorant compositions in a specific manner. Preferred thickeners are aqueous dispersions of copolymers of ethyl acrylate, acrylic acid and methacrylic acid, especially in the form of their ammonium salts. These thickeners exhibit their greatest thickening potential at above pH 7.5. In the uncharged state, ie. at a pH within the range from 2 to 3, by contrast, the preferred thickeners have a low viscosity of from about 1 to 10 mpa.s (at 23° C.)

The colorant composition may include further ingredients, if desired. As well as additives which are customarily used in colorant compositions, alkoxylated amines and alkoxylated alcohols are particularly suitable.

Alkoxylated amines useful in the colorant compositions of this invention generally have at least 20 carbon atoms and are secondary or tertiary amines containing hydrocarbon radicals which are saturated or unsaturated, and at least one of these radicals being interrupted by one or more oxygen atoms. The hydrocarbon radicals in question are straight-chain, branched or cyclic and optionally interrupted by one or more imino groups and/or substituted by one or more, for example from 1 to 5, hydroxyl groups.

The preparation of these alkoxylated amines and preferred structures are described in German Patent Application DE-A-3818183. The alkoxylated amines in question cause better penetration in leather dyeing, in particular. The concentration of the alkoxylated amines in the colorant compositions depends on the later use. For leather dyeing, the proportion is preferably such that the amines are used in an amount of from 0.1 to 5% by weight, preferably from 0.3 to 3% by weight, in particular from 0.3 to 2% by weight, based on the moist weight of the leather to be dyed.

Alkoxylated alcohols are a further advantageous addition. Alkoxylated alcohols useful in the process of this invention are alcohols containing a hydrocarbon radical which is saturated or unsaturated and interrupted by one or more oxygen atoms. The hydrocarbon radical in question is straight-chain, branched or cyclic and optionally substituted by hydroxyl groups. Reference is again made to DE-A-3818183 concerning the preparation and preferred structures.

In addition, it is frequently advantageous to add a little water to the colorant composition to achieve the desired consistency.

The colorant compositions of this invention are particularly useful for dyeing cotton, wool, polyamides and leather. The use of the colorant compositions for dyeing leather is particularly preferred.

The novel process for dyeing leather is advantageously carried out by initially subjecting the leather to be dyed to a pretreatment, for example retanning, neutralization and/or milling.

The pretreated leather is then dyed up by means of a conventional exhaust method using a colorant composition of this invention: For example, the leather is dyed in an aqueous solution using a liquor ratio of from 1.5:1 to 20:1, preferably from 2:1 to 10:1, and at a temperature of for example from 20 to 100° C., preferably from 40 to 60° C. Depending on the type of leather to be dyed, the respective colorant composition is used for example in an amount of from 0.25 to 15% by weight, preferably from 1.0 to 10% by weight, based on the weight of the leather. Similarly, the dyeing time depends on the type of leather to be dyed, but generally ranges for example from 20 to 180 minutes.

The dyebath may include further generally customary additives, for example wetting agents, leveling agents, color-deepening agent and/or fatliquoring agents, added before, during or after dyeing. The presence of the above-mentioned alkoxylated amines and/or alcohols is particularly advantageous. Acidification can be advantageous at the end of the dyeing process, for example with formic acid. The dyeing process is then terminated following a short treatment time. The dyed leather is finished in a conventional manner.

The dyeing process of this invention is suitable for all varieties of leather, for example full grain or raised leather, chrome leather, retanned leather or suede leather from goat, sheep, cattle and pig. The dyeings obtained are uniform, deep and high hiding and have good general fastness properties.

EXAMPLE 1

75 g of an aqueous black dye mixture comprising dyes Ia and IIa (in a mixing ratio Ia/IIa=1:2) in a total amount of 20% by weight were stirred with 30 g of a carbon black pigment dispersion (40% by weight of carbon black pigment) for 10 min. 5 ml of a thickener based on an aqueous dispersion of a copolymer of ethyl acrylate, acrylic acid and methacrylic acid (Latekoll® D, from BASF AG, Ludwigshafen) were then gradually added with stirring and stirred in for 60 min. 4 ml of water were then added to set the desired consistency.

The colorant composition was stored at 20° C. for 2 months. During this period, no sedimentation or serum separation was observed. The colorant composition presented no problems when used in an automatic metering means.

A comparative experiment with the same colorant composition but without the thickener resulted in a mixture which showed distinct signs of sedimentation and serum formation after just two days.

The following colorant preparations were prepared in a similar manner:

| Example | Dye | Pigment | Hue |
|---|---|---|---|
| 2 | Dye Ia, 30% strength by weight | Carbon black pigment dispersion | Black |
| 3 | Dye IIa, 20% strength by weight | Carbon black pigment dispersion | Black |

EXAMPLE 4

70 g of an aqueous dark green dye mixture comprising dye Im in an amount of 20% by weight were stirred with 25 g of a pigment dispersion (50% by weight of pigment) consisting of 90% by weight of C.I. Pigment Green 7 (74260) and 10% by weight of C.I. Pigment Blue (74160) (solids composition) for 10 min. 1 g of a thickener based on an aqueous dispersion of a copolymer of ethyl acrylate, acrylic acid and methacrylic acid (Latekoll D., from BASF AG, Ludwigshafen) was then gradually added with stirring and stirred in for 60 min.

The colorant composition was stored at 20° C. for 1 month. During this period, no sedimentation or serum separation was observed. The colorant composition presented no problems when used in an automatic metering means.

We claim:

1. A colorant composition, comprising:

8–40% by weight of at least one anionic dye selected from the group consisting of azo dyes, metal phthalocyanine dyes, and anthraquinone dyes substituted by at least one sulfonic acid group, 2–30% by weight of at least one pigment, 1–20% by weight of a polymeric polyanionic thickener, and 50–92% by weight of water or a predominantly aqueous diluent.

2. Colorant compositions as claimed in claim 1, comprising an acid dye of the general formula I

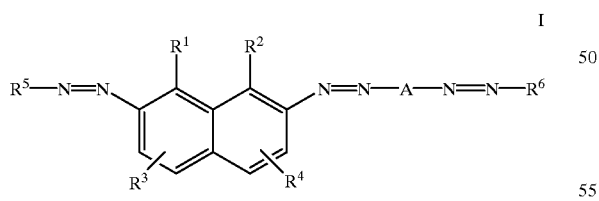

where
   $R^1$ and $R^2$ are each hydroxyl, amino or hydrogen, one of the radicals being hydroxyl,
   $R^3$ and $R^4$ are each hydrogen or $SO_3H$, at least one of the radicals being $SO_3H$,
   $R^5$ is a substituted or unsubstituted phenyl or naphthyl radical,
   $R^6$ is a substituted phenyl or naphthyl radical, at least one substituent being an amino or hydroxyl group, and A is

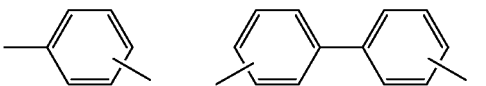

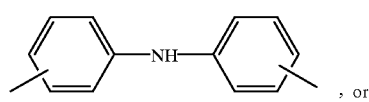

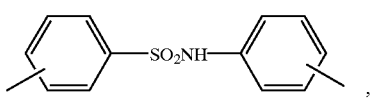

where the aromatic rings are substituted or unsubstituted.

3. Colorant compositions as claimed in claim 1, comprising an acid dye of the formula II

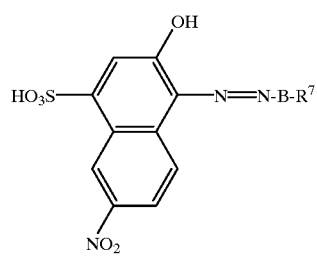

where
   B is a substituted phenylene or naphthylene radical, one substituent being a hydroxyl group ortho to the diazo group, and
   $R^7$ is hydrogen or

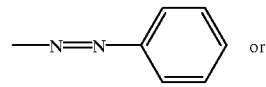

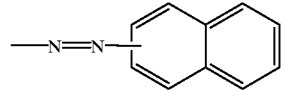

which is substituted or unsubstituted in the aromatic ring system, or a metal complex thereof.

4. Colorant compositions as claimed in claim 1, wherein the pigments and dyes are black.

5. Colorant compositions as claimed in claim 1 comprising carbon black pigments.

6. Colorant compositions as claimed in claim 1 comprising one or more iron oxide pigments.

7. Colorant compositions as claimed in claim 1, wherein the polyanionic thickener is an acrylic acid polymer or copolymer.

8. A process for dyeing leather by the exhaust method, which comprises contracting the leather with an aqueous liquor comprising a colorant composition as claimed in claim 1.

9. A colorant composition, comprising:
 8–18% by weight of at least one anionic dye selected from the group consisting of azo dyes, metal phthalocyanine dyes, and anthraquinone dyes substituted by at least one sulfonic acid group,
 5–17% by weight of at least one pigment,
 3–15% by weight of a polymeric polyanionic thickener, and
 50–84% by weight of water or a predominantly aqueous diluent.

* * * * *